United States Patent
Lee

(10) Patent No.: US 7,920,475 B2
(45) Date of Patent: Apr. 5, 2011

(54) SYSTEM AND METHOD FOR ADAPTIVE REMOVAL OF DELAY JITTER EFFECT AND LOW END-TO-END DELAY

(75) Inventor: Jay J. Lee, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 189 days.

(21) Appl. No.: 12/335,079

(22) Filed: Dec. 15, 2008

(65) Prior Publication Data

US 2010/0149976 A1     Jun. 17, 2010

(51) Int. Cl.
*G01R 31/08*     (2006.01)
*G06F 11/00*     (2006.01)
*H04J 1/16*      (2006.01)
*H04J 3/14*      (2006.01)

(52) U.S. Cl. ......... 370/235; 370/236; 370/252; 370/253

(58) Field of Classification Search .................. 370/230, 370/231, 235, 236, 252, 253
See application file for complete search history.

(56) References Cited

U.S. PATENT DOCUMENTS

| | | | |
|---|---|---|---|
| 5,625,764 A * | 4/1997 | Tsujimoto et al. | 345/640 |
| 6,934,280 B1 * | 8/2005 | Ho et al. | 370/352 |
| 7,443,871 B2 * | 10/2008 | Newson et al. | 370/429 |
| 7,830,900 B2 * | 11/2010 | Black et al. | 370/412 |
| 2005/0201414 A1 * | 9/2005 | Awais | 370/468 |
| 2006/0013263 A1 * | 1/2006 | Fellman | 370/503 |
| 2007/0019552 A1 * | 1/2007 | Senarath et al. | 370/235 |
| 2007/0121597 A1 * | 5/2007 | Lee et al. | 370/356 |
| 2008/0049795 A1 * | 2/2008 | Lakaniemi | 370/516 |
| 2008/0159337 A1 * | 7/2008 | Lee | 370/498 |
| 2009/0310491 A1 * | 12/2009 | Ginsberg et al. | 370/241 |

* cited by examiner

*Primary Examiner* — Chi H Pham
*Assistant Examiner* — Farah Faroul

(57) ABSTRACT

Systems, modules, methods and computer readable mediums for adaptive removal of delay jitter and low end-to-end delay are provided. The method may include the following operations at a delay buffer: calculating a holding time for a plurality of packets input into a network; buffering each of the plurality of packets for the duration of the holding time; and arranging the buffered packets in a sequence indicative of an order in which the buffered packets were input into the network. The holding time may be based on a difference between a current maximum delay of the plurality of packets in a current time window and a delay of a first packet of the plurality of packets in the current time window. The method may also include playing back the buffered packets at a selected playback time. Playing back the buffered packets may be performed at a reception mechanism.

14 Claims, 6 Drawing Sheets

SYSTEM AND METHOD FOR ADAPTIVE REMOVAL OF DELAY JITTER EFFECT AND LOW END-TO-END DELAY

BACKGROUND INFORMATION

Telecommunications systems and methods transport information for applications that have different performance requirements. For example, interactive real-time applications, such as voice over Internet protocol (VoIP) and video telephony (VT), have strict end-to-end delay and delay jitter requirements. With VoIP, for example, an end-to-end delay less than 150 milliseconds (ms) may not be perceived by a human ear, delay between 150 and 300 ms may be perceptible but ideal, and delay exceeding 300 ms may be unacceptable and hinder the interactivity possible in voice communications. Therefore, a network may be configured to disregard packets having a delay greater than a selected threshold. Such a configuration may lead to packet loss and a further degradation of the network quality.

End-to-end delay of packets in a network may be caused by transmission delays and/or queuing delays in routers and/or other components of the network that process the packets. Delay jitter in the network may be caused by the variation in delay experienced by individual packets. Because of delay jitter, packets may be received in an order different than the order in which the packets were input into the network. To address these issues, conventional systems and methods may be designed to buffer packets for longer periods of time, thereby reducing the effects of delay jitter, because packets can be received and re-ordered prior to playback at the receiver. The drawback to this approach is excessive end-to-end delay. One approach is to buffer packets for shorter periods of time to maintain acceptable end-to-end delay. The drawback to this approach is that the effects of delay jitter may not be removed.

Accordingly, conventional systems and methods may disadvantageously degrade the quality of the application due to lost packets or extensive buffering to attempt to capture delayed packets. Accordingly, these systems may not meet delay performance requirements and/or may experience severe degradation in the communication due to an extensive number of lost packets.

One exemplary conventional system and method of addressing end-to-end delay and delay jitter is the maximum delay variation (MDV) method. The conventional MDV method may remove delay jitter by buffering the packets at their destination for the duration of maximum delay variation, which is defined as the constant value that is the difference between the maximum delay of the packets and the minimum delay of the packets in a single data session. As used herein, the term "data session" means a voice call or video or other communication session from beginning to end. While the conventional MDV method may be used to remove the de-sequencing effect of delay jitter completely, the time for which the packets are buffered may be greater than necessary, thereby causing unnecessary delay before playback of the packets at the receiver. The unnecessary delay may cause end-to-end delay to be greater than allowed for interactive real-time applications such as VoIP and VT.

BRIEF DESCRIPTION OF THE DRAWINGS

Purposes and scope of exemplary embodiments described below will be apparent from the following detailed description in conjunction with the appended drawings in which like reference characters are used to indicate like elements, and in which.

DETAILED DESCRIPTION OF EXEMPLARY EMBODIMENTS

In exemplary embodiments, systems, modules, methods and/or computer readable mediums for adaptive removal of delay jitter and low end-to-end delay are provided. The embodiments calculate a holding time for holding packets in a delay buffer. The holding time is based on the end-to-end delay of the first packet provided in the network. The packets may be output from the delay buffer in the order in which the packets were input into the network. With lower end-to-end delay of the first packet, the holding time may be lower. Accordingly, the embodiments provide a flexible methodology for altering the holding time according to the network characteristics. Further, the embodiments buffer the packets for a minimal holding time that is at least as low as (or lower than) the holding time for the conventional MDV method. After being output from the delay buffer, the packets may be played back at selected playback times that are a function of the holding time, and an interval of time over which, and the order in which, the packets were input into the network.

It is understood that the modules described herein may include one or more additional modules, some of which are explicitly shown in the figures and/or others that are not. As used herein, the term "module" may be understood to refer to computing software, firmware, hardware, circuitry and/or various combinations thereof. It may be noted that the modules are merely exemplary. The modules may be combined, integrated, separated, and/or duplicated to support various applications. Also, a function described herein as being performed at a particular module may be performed at one or more other modules instead of or in addition to the function performed at the particular module shown. Further, the modules may be implemented across multiple devices and/or other components local or remote to one another. Additionally, the modules may be moved from one device and/or added to another device, and/or may be included in both devices.

It is also noted that the figures, in general, illustrate various components as separate entities from one another. The illustration of components as separate entities from one another is merely exemplary. The components may be combined, integrated, separated and/or duplicated to support various applications.

Finally, it is also noted that although the flow chart provided herein shows a specific order of method steps, it is understood that the order of these steps may differ from what may be depicted. Also two or more steps may be performed concurrently or with partial concurrence. Such variation will depend on the software and/or hardware systems chosen and/or on designer choice. It is understood that all such variations are within the scope of the exemplary embodiments. Likewise, software and/or web implementations of the exemplary embodiments could be accomplished with standard programming techniques with rule based logic and/or other logic to accomplish the various steps.

Figure 1:
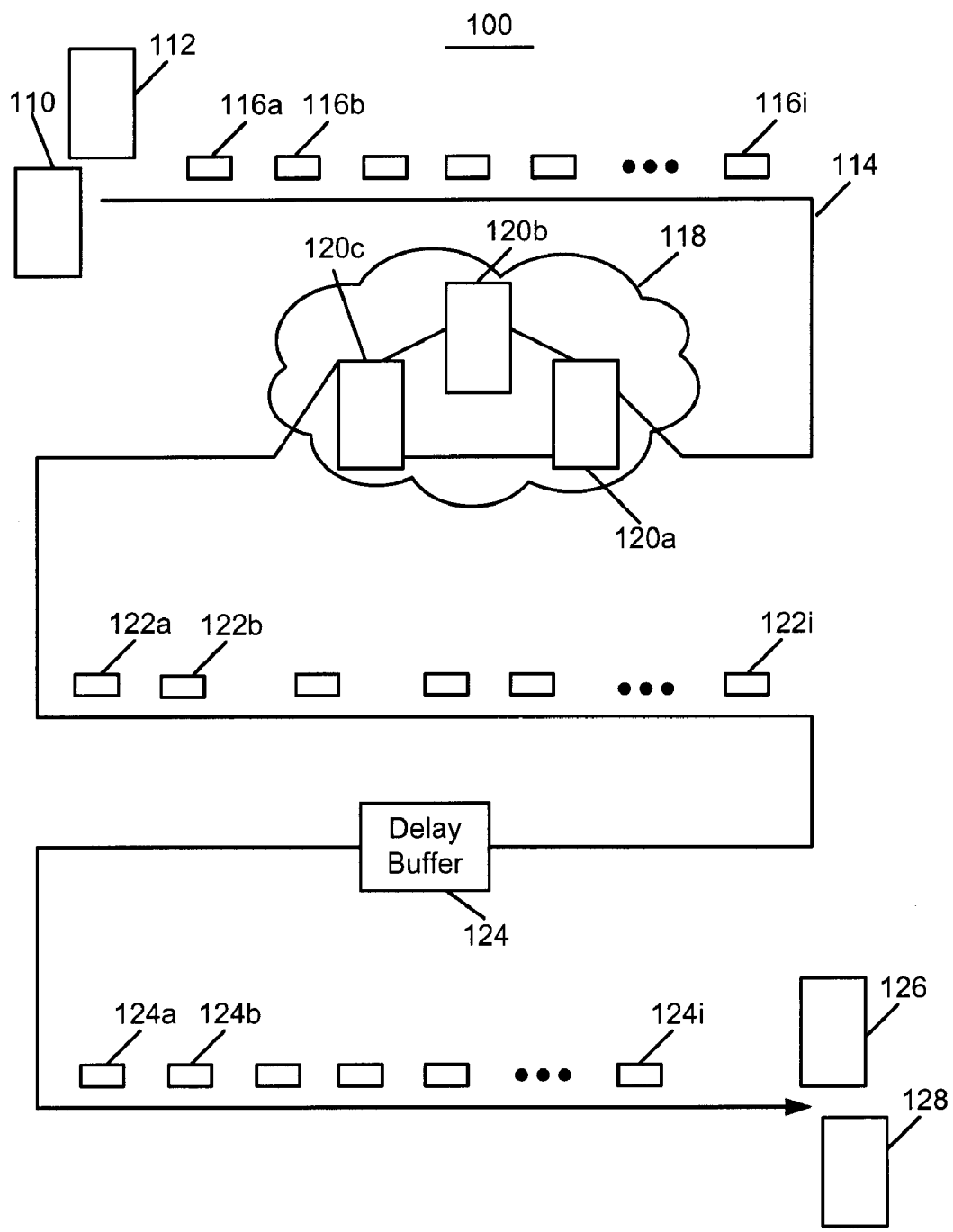
FIG. 1 is a schematic diagram of a system for adaptive removal of delay jitter effects and low end-to-end delay in accordance with exemplary embodiments.

FIG. 1 is a schematic diagram of a system for adaptive removal of delay jitter effects and low end-to-end delay in accordance with exemplary embodiments. As shown, system 100 may include one or more input mechanisms 110, 112, input packets 116a, 116b, . . . 116i, a network 118 having one or more modules 120a, 120b, 120c configured to receive the input packets 316a, 116b, . . . 116i and output routed packets 122a, 122b, . . . 122i. The system 100 may also include a delay buffer 124 configured to receive routed packets 122a, 122b, . . . 122i, buffer and output buffered packets 124a, 124b, . . . 124i at one or more selected time intervals. The system 100 may also include one or more reception mechanisms 126, 128 configured to receive and playback the buffered packets 124a, 124b, . . . 124i. In the embodiment shown, the system 100 includes the input mechanisms 110, 112, the delay buffer 124 and the reception mechanisms 126, 128 communicatively coupled to the network 118. The modules 120a, 120b, 120c may be communicatively coupled to one another and configured to route the received input packets 116a, 116b, . . . 116i.

In some embodiments, the delay buffer 124 may be provided within each of the reception mechanisms 126, 128.

In some embodiments, the input mechanisms 110, 112 may be any number of hardware and/or software mechanisms or modules configured to input information into the system 100. Similarly, the reception mechanisms 126, 128 may be any number of hardware and/or software mechanisms or modules configured to receive and playback information input into the system 100. In various embodiments, the input mechanisms 110, 112 and/or the reception mechanisms 126, 128 may include, but is not limited to, be a server (e.g., a multimedia server), a computer, a personal computer, a laptop, a cellular communication device, a workstation, a mobile device, a phone, a handheld PC, a personal digital assistant (PDA), a thin system, a fat system, a network appliance, an Internet browser, a pager, an alert device, a computer monitor, a liquid crystal display (LCD), a cathode ray tube (CRT), a rear projection television (RPTV), a flat panel television, a plasma display, a surface-conduction electron-emitter display (SED), a video projector, a light-emitting diode (LED), an organic light-emitting diode (OLED) and/or other any other device capable of transmitting and/or receiving communications.

The input packets 116a, 116b, . . . , 116i may be input into the system 100 after being generated at the input mechanism 110, 112 by a user providing information to the input mechanism 110, 112. The input packets 116a, 116b, . . . 116i may be input at a substantially constant rate. In one embodiment, the rate may be every 20 ms.

In various embodiments, the network 118 may be any number of different types of networks configured to transmit information, including, but not limited to, voice, video and/or data. In some embodiments, the voice, video and/or data may be for a real-time application. In exemplary embodiments, the network 118 may include, but is not limited to, any Ethernet, internet protocol (IP), wireline, wireless, VoIP, Fiber Optic Service (FiOs) Fiber to the x (FTTx), internet protocol television (IPTV), terrestrial, satellite and/or hybrid fiber coaxial (HFC) network, Wide Area Network ("WAN"), Local Area Network ("LAN"), the Internet, optical and/or an infrared network, and any other network capable of transmit voice, video or data information.

In some embodiments, the network 118 may be any network configured to provide network layer transport of packets of real-time information according to the real-time transport protocol (RTP).

The modules 120a, 120b, 120c may be any hardware and/or software mechanisms configured to route one or more packets of information received at the modules 120a, 120b, 120c. The modules 120a, 120b, 120c may queue the packets of information at different times or for different time intervals before outputting the routed packets 122a, 122b, . . . 122i. In some embodiments, the modules 120a, 120b, 120 may be routers. Such difference in queuing time may cause delay jitter.

The network 118 may receive the input packets 116a, 116b, . . . 116i. One or more of the modules 120a, 120b, 120c may route and/or queue and route the input packets 116a, 116b, . . . 116i, after differing amounts of delay, before outputting the routed packets 122a, 122b, . . . 122i. As shown, the routed packets 122a, 122b, . . . 122i may have differing amounts of delay, thereby causing delay jitter, after being output from the network 118.

The delay buffer 124 may receive the routed packets at different times due to the delay jitter. The delay buffer 124 may be any module configured to temporarily retain packets of information and output the retained packets of information when a selected condition may be met. The delay buffer 124 may output the buffered packets 124a, 124b, . . . 124i after a determined holding time. While one delay buffer 124 is described herein, it is understood that multiple delay buffers may be provided in the system 100. For example, in embodiments wherein a delay buffer is provided within each of the reception mechanisms 126, 128, the system 100 include at least two delay buffers. Any number of delay buffers may be provided in the system 100.

The buffered packets 124a, 124b, . . . 124i output may be received at one or more of the reception mechanisms 126, 128. The one or more reception mechanisms 126, 128 may playback the buffered packets 124a, 124b, . . . 124i. In various embodiments, the reception mechanisms 126, 128 may be able to playback the buffered packets with low end-to-end delay relative to the end-to-end delay of the conventional MDV method.

It is noted that the description of the embodiments described herein include multiple input packets 116a, 116b, . . . 116i, buffered packets 124a, 124b, . . . 124i, routed packets 122a, 122b, . . . 122i, modules 120a, 120b, 120c, input mechanisms 110, 112 and reception mechanisms 126, 128. However, the description is merely exemplary and the embodiments of the invention do not require such multiple instances of any component of the system 100. For example, in other embodiments of systems and methods, a single input mechanism, reception mechanism and module may be provided. As another example, the input packets, buffered packets and/or the routed packets may include any number of two or more packets. For example, there may be an embodiment with two input packets, two buffered packets and two routed packets. All such variations of embodiments are envisaged and within the scope of the embodiments disclosed and claimed herein.

Figure 2:
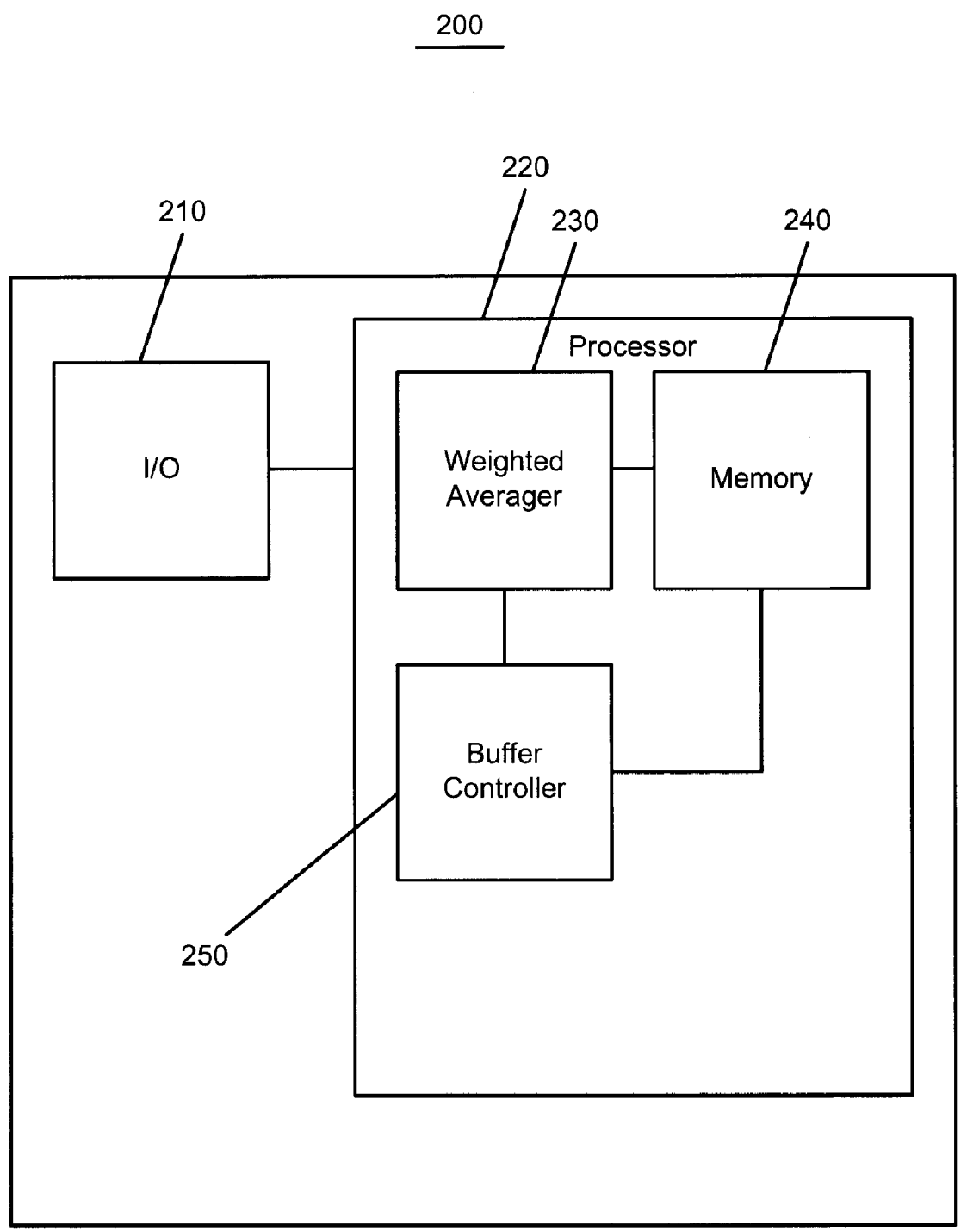
FIG. 2 is a block diagram of a delay buffer in accordance with exemplary embodiments.

FIG. 2 is a block diagram of a delay buffer in accordance with exemplary embodiments. The delay buffer 200 may include an input/output (I/O) mechanism 210 communicatively coupled to a processor 220. The processor 220 may include a weighted averager 230, memory 240 and a buffer controller 250.

The weighted averager 230 may be communicatively coupled to the memory 240 and to the buffer controller 250. The weighted averager 230 may include, but is not limited to a filter, a combiner, and/or any hardware, circuitry, software and/or combination of hardware, circuitry and/or software capable of calculating a weighted average of inputs to the weighted averager 230.

In various embodiments, the delay buffer may determine the optimal holding time for buffering packets such that the de-sequencing effects of delay jitter are removed and end-to-end delay is maintained at a low level. The delay buffer 200 will be further described with reference to FIG. 4.

Figure 3:
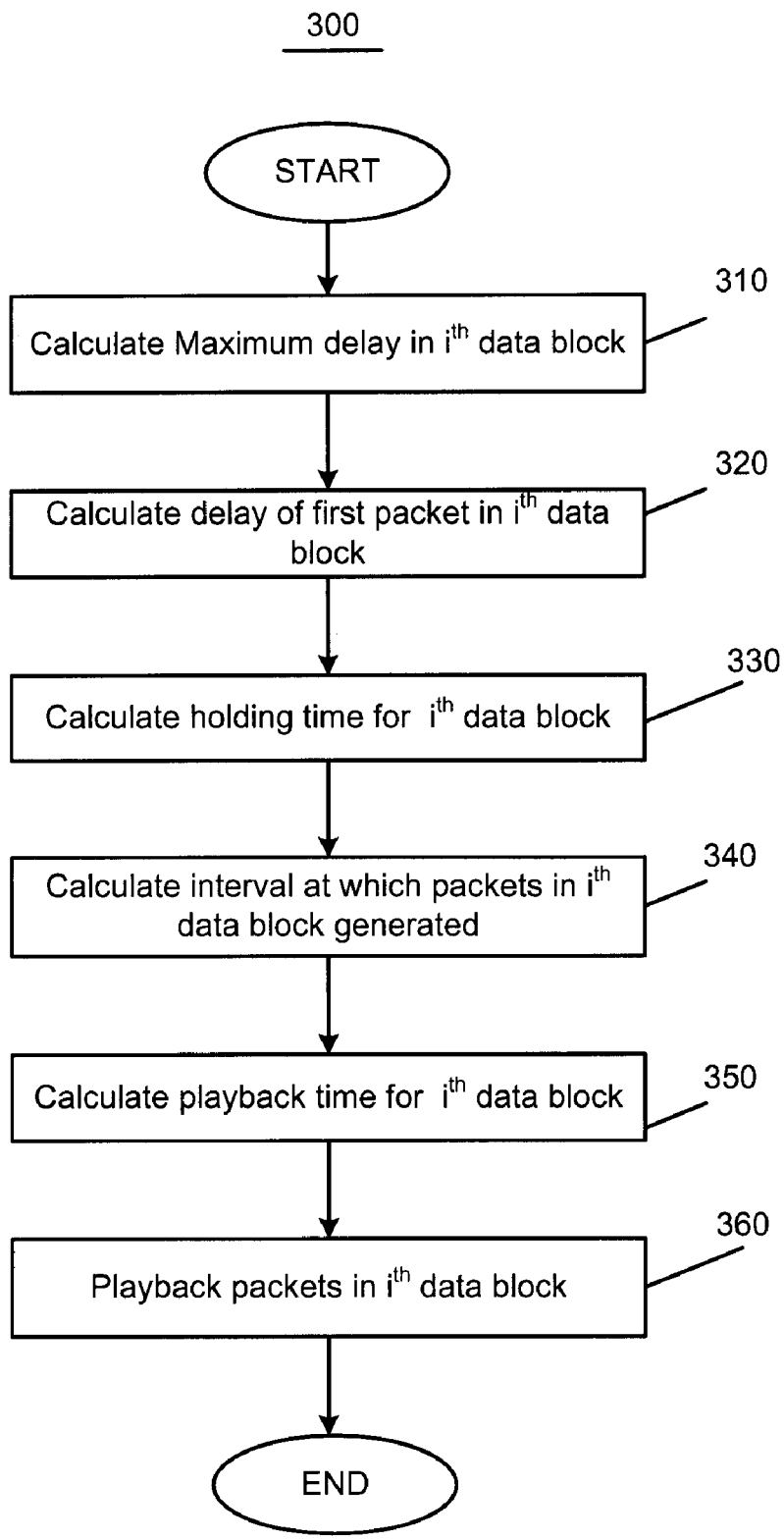
FIG. 3 is a flow chart illustrating a method for adaptive removal of delay jitter effects and low end-to-end delay in accordance with exemplary embodiments.

FIG. 3 is a flow chart illustrating a method for adaptive removal of delay jitter effects and low end-to-end delay in accordance with exemplary embodiments. The method 300 shall be described with reference to FIGS. 2 and 4. It is understood that the method 300 may be extended to the structure of FIGS. 1 and 2. Further, FIG. 3 represents an exemplary embodiment and is not meant to be limiting. In particular, the method 300 may be executed or otherwise performed by one or a combination of various method steps. The method 300 and/or its steps are not limited to any particular type of structure, whether hardware, software or a combination of hardware and software. With regard to hardware, the method 300 may be performed by analog or digital circuitry such as that found in any number of devices, including, but not limited to, integrated circuits and/or an Application-Specific Integrated Circuit ("ASIC") chip (or software). With regard to software, one or more steps of the method 300 may be performed by a computer-readable medium having an executable computer program for performing the steps of the method 300 described herein. While the method may be described with reference to packets of a data session, it should be understood that packets of a data session and/or of any other accumulations of information may also be transported and the method applied thereto.

In block 310, the maximum delay of a packet in the $i^{th}$ time window, $\text{MaxD}_i$ may be calculated.

In some embodiments, the time window may be a block of information in an RTP session. To estimate the maximum delay of the time window, a sliding time window method may be used wherein the maximum delay for each time window of period T may be computed. For the current time window, the maximum delay may be estimated by computing a weighted moving average of maximum delay values from previous time windows. In some embodiments, the maximum delay may be estimated as the weighted moving average of previous time windows as follows:

$$\text{MaxD}_i = w \cdot \text{MaxD}_{i-1} + (1-w) \cdot \text{MaxD}_{i-2} \quad (1)$$

where the maximum delay experienced by a packet in time window i is $\text{MaxD}_i$, and a weighted moving average constant value is w, where $0 \leq w \leq 1$. The weighted averager 230 may calculate the weighted average. In some embodiments, the previous values of the maximum delays may be accessed from the memory 240 of the delay buffer 200.

In some embodiments, the maximum delay may be a value previously-stored prior to starting the method 300. For example, the value may be the last value calculated when the method 300 was last performed. As another example, the value may be pre-programmed into the hardware and/or software performing the method 300.

Should a maximum delay be calculated from a weighted moving average constant, a smaller value of w may place less weight on the current period, while a larger value of w may place more weight on past periods. By setting appropriate weights, the weighted moving average may reduce significant fluctuations in maximum delays of time windows.

Returning to FIG. 3, in block 320, a delay of the first packet in the ith time window may be calculated. The delay may be calculated by the buffer controller 250. In some embodiments, the delay of the first packet of the ith time window may be readily found by using time stamp information in the RTP header of the packet.

Figure 4:
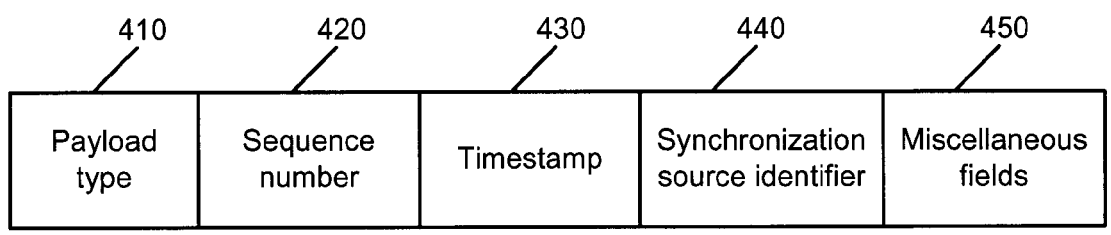
FIG. 4 is a block diagram of a real time transport packet (RTP) header in accordance with exemplary embodiments.

FIG. 4 is a block diagram of an RTP header in accordance with exemplary embodiments. The fields of the RTP header 400 may include a payload type field 410, a sequence number field 420, a timestamp field 430, a synchronization source identifier field 440 and/or one or more miscellaneous fields 450. The payload type field 410 may be a 7-bit field that indicates the type of information encoding technique that is being used. For example, the payload type field 410 may indicate the audio and/or video encoding technique being used. The sequence number field 420 may be 16-bit field increments for each RTP packet sent. The sequence number field 420 may be used by the reception mechanisms 126, 128 to detect packet loss and/or to restore packet sequence.

The timestamp field 430 may be a 32-bit field including information indicative of the time at which the first octet of data in the payload may have been generated. The time may be indicated by a value generated from a local clock at the input mechanism. The reception mechanisms 126, 128 may use the information in the timestamp field 430 to remove delay jitter introduced in the network and/or to provide synchronous playback at the reception mechanisms 126, 128.

The synchronization source identifier (SSRC) field 440 may be a 32-bit field. The SSRC field 440 may include a randomly generated value that may uniquely identify the input mechanism within a session. Typically, each stream of packets in an RTP session may have a distinct SSRC.

Referring back to FIG. 3, in block 320, the delay may be found by calculating the difference between the received time for the packet and the time that the packet was generated $$d_{i1} = r_{i1} - t_{i1} \quad (2)$$

where the timestamp of a $j^{th}$ packet in time window, i, or the time that the packet j was generated by the input mechanism in time window i is $t_{ij}$; and the time that the packet j may be received by reception mechanisms 126, 128 for time window i, is $r_{ij}$; resulting in an end-to-end delay experienced by packet j for time window i of $d_{ij}$.

The timestamp field 430 may provide the time when the packet was generated. Note that RTP encapsulation may be seen only at the end systems.

In block 330, the holding time for the ith time window may be calculated by determining the difference between the maximum delay and the delay of the first packet, as follows:

$$q_i = \text{MaxD}_i - d_{i1} \quad (3)$$

where the required holding time at the delay buffer for the time window i is $q_i$.

The holding time may be calculated by the buffer controller 250. This may be the holding time required to remove the de-sequencing effects of the delay jitter at the reception mechanisms 126, 128, thereby allowing the reception mechanism 126, 128 to playback the packets in the order in which they were generated and input into the system 100 from the input mechanism 110, 112.

After holding the packets at the delay buffer for the duration of $q_i$, the receiver may receive and playback the packets at a fixed interval. The fixed interval may be the same time interval by which the packets were generated and input into the system.

In block 340, the time interval during which the first two packets of time window i are input into the system 100 may be calculated as follows:

$$si_i = t_{i2} - t_{i1} \quad (4)$$

where $si_i$ is the time interval, $t_{i1}$, is the time at which the first packet of time window i was input into the system 100, and $t_{i2}$ is the time at which the second packet of time window i was input into the system 100. The values of $t_{i1}$ and $t_{i2}$ may be determined by accessing the timestamp values in the first and second packets.

In block 350, for the given time window i, the playback time for jth packet, $p_{ij}$, may be calculated as follows:

$$p_{ij} = r_{i1} + c \cdot q_i + (j-1) \cdot si_i, \text{ for all } j \quad (5)$$

where the playback time of packet j in a time window i is $p_{ij}$, and c may be a positive constant that may provide additional holding time to further minimize packet loss due to potential deviation in estimating the maximum delay in a time window. Accordingly, c>0. The buffer controller 250 may calculate the playback time.

In block 360, the packet j in a time window i is played back. The playback of the packet j may be performed at the reception mechanism 126, 128.

After step 360, the method 300 may end for the packets transmitted in time window i. The method 300 may be repeated for packets transmitted in another time window other than time window i. For example, the method may be repeated for packets transmitted in the next time window.

Table 1 illustrates exemplary end-to-end delay, delay jitter and playback time values for a conventional MDV method as compared to the method 300.

The Departure Time column of Table 1 illustrates packets generated and immediately input into the network 118 from the input mechanism 110, 112 every 20 ms. It may be assumed that eight packets are generated at the input mechanism 110, 112, with the first packet being generated at time 0 and subsequent packets being generated every 20 ms.

The Arrival Time column of Table 1 illustrates the times when the packets input into the network 118 arrive at the delay buffer 124. In embodiments wherein the delay buffer 124 may be located within the reception mechanisms 126, 128, the Arrival Time may be the time when the packets arrive at the reception mechanisms 126, 128.

The end-to-end delay for each packet may be shown in the End-to-End Delay column of Table 1. The End-to-End Delay may be calculated as the difference between the Arrival Time and the Departure Time. The packets input into the network may experience various delays, and therefore each packet may have a same or different end-to-end delay as another packet. As shown, although packet 5 was input into the network after packet 4, because of the end-to-end delay of packet 4, packet 5 arrives prior to packet 4. Accordingly, the packets may arrive out of sequence relative to the sequence in which they were generated and input into the network. This de-sequencing effect of delay jitter may be removed using the method 300 of FIG. 3.

TABLE 1

Exemplary Delay and Delay Jitter

| Packet # | Departure Time (ms) | Arrival Time (ms) | End-to-end Delay (ms) | Playback time from MDV method (ms) | Playback time ($p_{ij}$) from the method of described invention (ms) |
|---|---|---|---|---|---|
| 1 | 0 | 250 | 250 | 360 | 310 |
| 2 | 20 | 260 | 240 | 380 | 330 |
| 3 | 40 | 270 | 230 | 400 | 350 |
| 4 | 60 | 300 | 240 | 420 | 370 |
| 5 | 80 | 280 | 200 | 440 | 390 |
| 6 | 100 | 320 | 220 | 460 | 410 |
| 7 | 120 | 380 | 260 | 480 | 430 |
| 8 | 140 | 450 | 310 | 500 | 450 |

Figure 5:
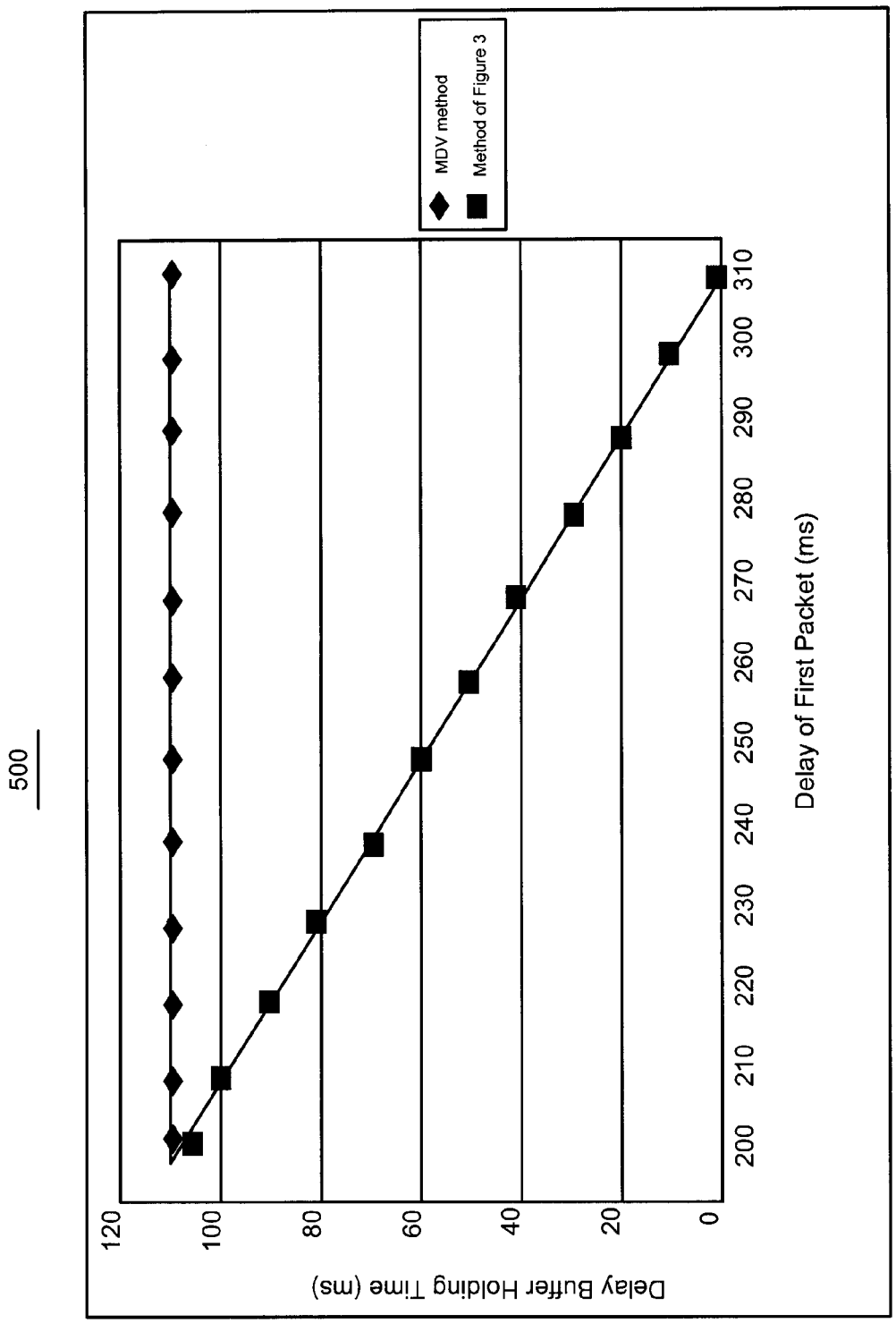
FIG. 5 is a graph illustrating delay buffer holding time using the conventional MDV method and the method of FIG. 3 in accordance with exemplary embodiments.

FIG. 5 is a graph illustrating delay buffer holding time using the conventional MDV method and the method of FIG. 4 in accordance with exemplary embodiments.

The conventional MDV method may calculate a constant value representative of a required delay buffer holding time for the packets in the network. Specifically, the conventional MDV method may calculate the required buffer holding time as the difference between the maximum end-to-end delay of the packets to be transmitted through the network and the minimum end-to-end delay of the packets to be transmitted through the network. The maximum end-to-end delay of the packets and the minimum end-to-end delay of the packets may be calculated after receiving each of the packets or the values may be previously-stored values from prior packets in the network and/or previously-stored values stored prior to purchase and/or installation of the delay buffer. Accordingly, the required delay buffer holding time employing the conventional MDV method may be 310 ms−200 ms=110 ms for the packets shown in Table 1. Referring to FIG. 5, the constant value of 110 ms may be employed as a delay buffer holding time for each packet using the conventional MDV method. The conventional MDV method may release the packet after buffering, and sequencing, the received packets for such time. Referring back to Table 1, the packet may be received at the reception mechanisms 126, 128 and played back at the playback time indicated in Table 1. The playback time may be a time dictated by receiving the packet and waiting 20 ms between playing back each received packet.

Therefore, if the delay buffer holds each of the packets received at the delay buffer for 110 ms before releasing each packet, and the reception mechanisms 126, 128 plays the packet back at a 20 ms interval between received packets, the de-sequencing effect of the delay jitter will be substantially removed. This may be shown in the Playback time from MDV method column of Table 1 wherein the packets are played back at 20 ms intervals and are in the sequence in which they were input into the network. As shown in FIG. 5, the delay buffer holding time for the conventional MDV method will always be approximately 110 ms no matter the delay of the first packet into the network.

However, the conventional MDV method disadvantageously and unnecessarily prolongs the Playback time of certain packets. For example, packet 8 was received at the 350 ms time but has a Playback time of 500 ms. Accordingly, the playback of packet 8 was 50 ms more than necessary. Unnecessary end-to-end delays occur with the conventional MDV method although the conventional MDV method removes delay jitter. Accordingly, the conventional MDV method does not facilitate the deployment of real-time applications that cannot tolerate substantial end-to-end delay.

By contrast, the method of FIG. 3 may calculate the required delay holding time as a substantially constant value approximately equal to the difference between the maximum end-to-end delay and the end-to-end delay of the first packet. For example, the required delay buffering time (i.e., holding time) may be calculated to be 310 ms−250 ms=60 ms. The maximum end-to-end delay of the packets and the minimum end-to-end delay of the packets may be calculated after receiving each of the packets or the values may be previously-stored values from prior packets in the network and/or previously-stored values stored prior to purchase and/or installation of the delay buffer. The method of FIG. 3 may then output the packet from the delay buffer after buffering the packet for the delay buffering time. The packet may be played back with a 20 ms interval between packets played back.

Therefore, if the delay buffer holds each of the packets received at the delay buffer for 60 ms before releasing the packet, and the reception mechanisms 126, 128 plays the packet back at a 20 ms interval between received packets, the de-sequencing effect of the delay jitter will be substantially removed.

Therefore, the method 300 may have a required delay buffer holding time of 60 ms and playback the packets received at the reception mechanisms 126, 128 at the same interval requires holding the packets only for 60 ms and then plays back the packets with 20 ms interval. This may be shown in the Playback time, $p_{ij}$, of the method of FIG. 3 column of Table 1.

Also, as shown in FIG. 5, the required delay buffer holding time may adaptively vary with the end-to-end delay of the first packet. As the end-to-end delay of the first packet decreases (or increases), the required delay buffer holding time decreases (or increases). Accordingly, the required delay buffer holding time may be less than (or at worst, equal to) the required delay buffer holding time of each packet using the conventional MDV method. Further, because the required delay buffer holding time may be less than (or at worst, equal to) the required delay buffer holding time, the end-to-end delay of each packet with the method 300 of FIG. 3 may be less than the end-to-end delay for the conventional MDV method. The method 300 of FIG. 3 may be equal to the conventional MDV method only when the delay of the first packet may be the minimum delay.

As shown in FIG. 5, packet 8 may have a playback time of approximately 350 ms, while still substantially removing the delay jitter effect of de-sequencing the packets. The method 300, therefore, completely removes the effects of delay jitter with lower end-to-end delay than the conventional MDV method.

Figure 6:
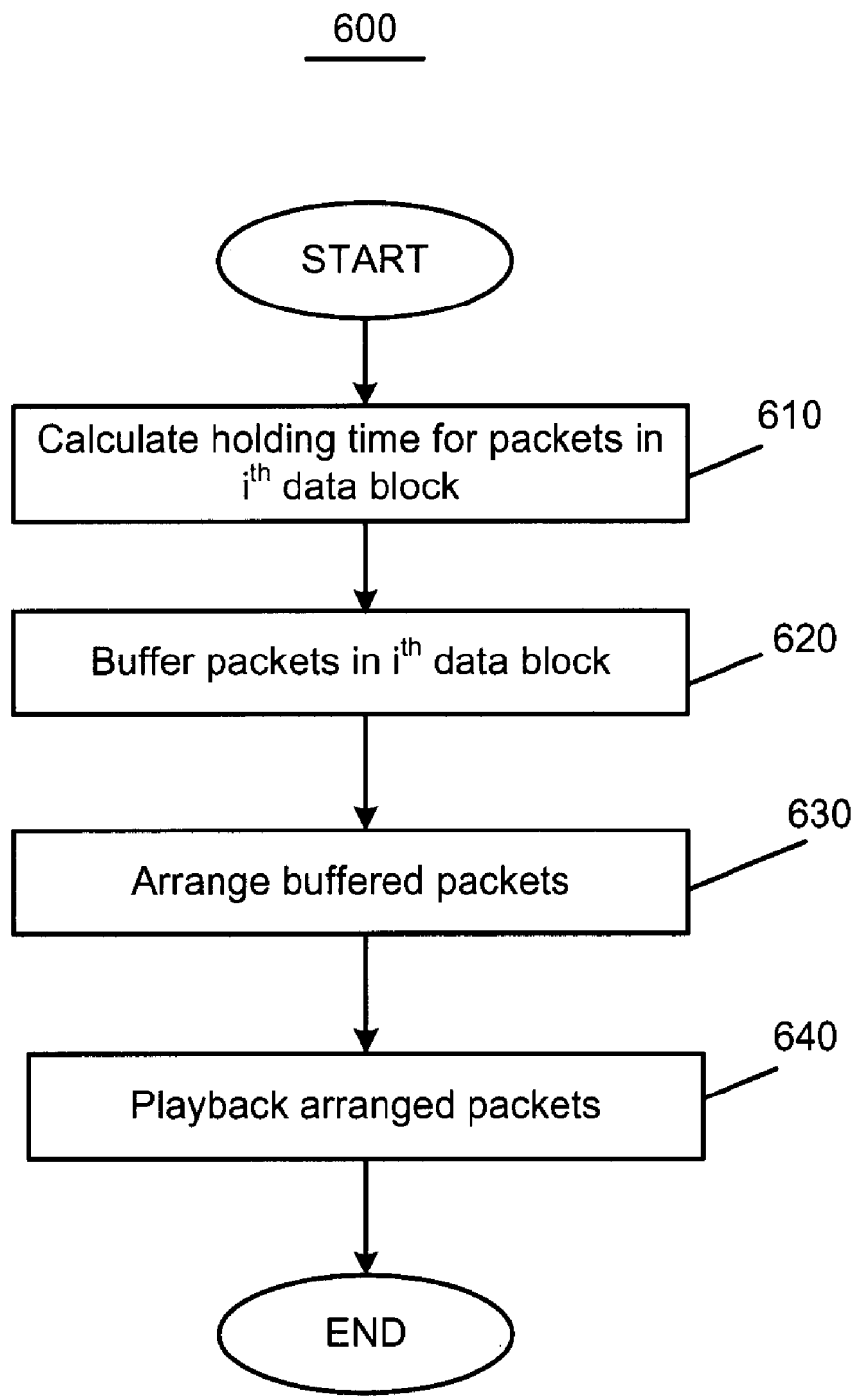
FIG. 6 is a flow chart illustrating another method for adaptive removal of delay jitter effects and low end-to-end delay in accordance with exemplary embodiments.

FIG. 6 is a flow chart illustrating another method for adaptive removal of delay jitter effects and low end-to-end delay in accordance with exemplary embodiments. It is understood that the method 600 may be extended to the structure of FIGS. 1, 2 and 4. Further, FIG. 6 represents an exemplary embodiment and is not meant to be limiting. In particular, the method 600 may be executed or otherwise performed by one or a combination of various method steps. The method 600 and/or its steps are not limited to any particular type of structure, whether hardware, software or a combination of hardware and software. With regard to hardware, the method 600 may be performed by analog or digital circuitry such as that found in any number of devices, including, but not limited to, integrated circuits and/or an Application-Specific Integrated Circuit ("ASIC") chip (or software). With regard to software, one or more steps of the method 600 may be performed by a computer-readable medium having an executable computer program for performing the steps of the method 600 described herein. While the method may be described with reference to packets of a data session, it should be understood that packets of a data session and/or of any other accumulations of information may also be transported and the method applied thereto.

In block 610, a holding time for a number of packets input into the system 100 during time window i may be calculated. The holding time may be calculated based on a difference between a current maximum delay of the packets in the time window i and a delay of a first packet of the plurality of packets in the time window i. The holding time may be calculated by the delay buffer 200.

In block 620, each of the packets for which a holding time is calculated may be buffered. The delay buffer 200 may buffer the packets.

In block 630, the buffered packets may be arranged. The arrangement may be a sequence indicative of an order in which the buffered packets were input into the network. The delay buffer 200 may arrange the packets.

In block 640, the arranged packets may be played back in the arranged order. The reception mechanism 126, 128 may playback the arranged packets at a selected playback time. In some embodiments, the selected playback time may be determined at least by the holding time; an interval of time over which the first plurality of the buffered packets were input into the network; and/or a value indicative of an order in which the selected one of the buffered packets was input into the network. In some embodiments, the first plurality of the buffered packets is the first two packets input into the network 118.

In the preceding specification, various exemplary embodiments of systems, modules, methods and/or computer readable mediums have been described with reference to the accompanying drawings. It will, however, be evident that various modifications and/or changes may be made thereto, and/or additional embodiments may be implemented, without departing from the broader scope of the invention as set forth in the claims that follow. The specification and/or drawings are accordingly to be regarded in an illustrative rather than restrictive sense.

What may be claimed is:

1. A method comprising:
    calculating, by a delay buffer, a holding time for a plurality of packets input into a network at a selected interval and transmitted during a current time window, the holding time being based on a difference between a current maximum delay of the plurality of packets in the current time window and a delay of a first packet of the plurality of packets in the current time window;
    buffering, at the delay buffer, each of the plurality of packets for a duration of the holding time;
    arranging, by the delay buffer, the buffered packets in a sequence indicative of an order in which the buffered packets were input into the network; and
    playing back, at a reception mechanism, at a selected playback time, a selected one of the buffered packets, the selected playback time being based on at least:
        the holding time;
        an interval of time over which a first plurality of the buffered packets were input into the network;
        a value indicative of an order in which the selected one of the buffered packets was input into the network;
        a time at which the selected one of the buffered packets is received; and
        a holding time modifier that is multiplied by the holding time, the holding time modifier having a value greater than zero, wherein the selected playback time is equal to a sum of the time at which the selected one of the buffered packets is received, the holding time modifier multiplied by the holding time, and the value indicative of the order in which the selected one of the buffered packets was input into the network multiplied by the interval of time over which the first plurality of the buffered packets were input into the network.

2. The method of claim 1, wherein the current maximum delay of the plurality of packets is a weighted moving average of a plurality of maximum delays corresponding to a respective plurality of time windows.

3. The method of claim 2, wherein the respective plurality of time windows occurred prior to the current time window.

4. The method of claim 1, wherein the delay of the first packet is determined from information associated with a real-time transport header of the first packet.

5. The method of claim 4, wherein the information is comprised in a timestamp field of the real-time transport header.

6. The method of claim 1, wherein the first plurality of the buffered packets is the first two packets input into the network during the current time window.

7. The method of claim 1, wherein the interval of time over which the first plurality of the buffered packets were input into the network is determined by calculating a difference between a first generation time at which the first packet was input into the network, and a second generation time at which a second packet was input into the network, the second packet being input into the network after the first packet was input into the network.

8. The method of claim 7, wherein the first generation time and the second generation time are determined from a first timestamp field associated with the first packet and a second timestamp field associated with the second packet.

9. A non-transitory computer-readable medium having an executable computer program comprising instructions to perform steps of the method of claim 1.

10. A computer-based system comprising:
a memory having a plurality of maximum delay values stored therein, wherein the plurality of maximum delay values comprises a first maximum delay value associated with a first time window and a second maximum delay value associated with a second time window, the first time window being indicative of a time period that is more recent than a time period associated with the second time window relative to a time period associated with a current maximum delay value;
a weighted averager communicatively coupled to the memory, and receiving one or more of the plurality of maximum delay values from the memory and calculating a current maximum delay of a plurality of packets input into a network, the current maximum delay being based on a weighted moving average of the plurality of maximum delay values; and
a buffer controller communicatively coupled to the weighted averager, and:
receiving the current maximum delay of the plurality of packets;
calculating the current maximum delay value by:
generating a first product by multiplying the first maximum delay value by a weighted moving average constant;
generating a second product by multiplying the second maximum delay value by a modified weighted moving average constant; and
determining a sum of the first product and the second product, the modified weighted moving average constant being such that the first product is greater than or equal to the second product
calculating a holding time for the plurality of packets based on a difference between the current maximum delay of the plurality of packets and a delay of a first packet of the plurality of packets;
buffering each of the plurality of packets for a duration of the holding time;
arranging the buffered packets in a sequence indicative of an order in which the buffered packets were input into the network; and
playing back the arranged packets at a selected playback time.

11. The computer-based system of claim 10, wherein the selected playback time is based on the holding time; an interval of time over which the buffered packets were input into the network; and a value indicative of an order in which the buffered packets was input into the network.

12. The computer-based system of claim 10, wherein the delay of the first packet is determined from information associated with a real-time transport header of the first packet.

13. A computer-based system comprising:
an input mechanism configured to input a plurality of packets into a network at a selected interval during a current time window;
a network configured to route the plurality of packets; and
a reception mechanism configured to receive the routed plurality of packets and having a module configured for:
calculating a holding time for the routed plurality of packets, the holding time being based on a difference between a current maximum delay of the plurality of packets in the current time window and a delay of a first packet of the plurality of packets in the current time window;
buffering each of the routed plurality of packets for the duration of the holding time;
arranging the buffered packets in a sequence indicative of an order in which the buffered packets were input into the network; and
playing back the arranged packets at a selected playback time, the selected playback time being based on at least:
the holding time;
an interval of time over which a first plurality of the buffered packets were input into the network;
a value indicative of an order in which the selected one of the buffered packets was input into the network;
a time at which the selected one of the buffered packets is received; and
a holding time modifier that is multiplied by the holding time, the holding time modifier having a value greater than zero, wherein the selected playback time is equal to a sum of the time at which the selected one of the buffered packets is received, the holding time modifier multiplied by the holding time, and the value indicative of the order in which the selected one of the buffered packets was input into the network multiplied by the interval of time over which the first plurality of the buffered packets were input into the network.

14. The computer-based system of claim 13, wherein the delay of the first packet is determined from information associated with a real-time transport header of the first packet.

* * * * *